(12) United States Patent
Bejerano et al.

(10) Patent No.: US 7,836,181 B2
(45) Date of Patent: Nov. 16, 2010

(54) FAIRNESS AND LOAD BALANCING IN WIRELESS LANS USING ASSOCIATION CONTROL

(75) Inventors: Yigal Bejerano, Springfield, NJ (US); Seung-Jae Han, Basking Ridge, NJ (US); Li Li, Iselin, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1482 days.

(21) Appl. No.: 11/205,768

(22) Filed: Aug. 17, 2005

(65) Prior Publication Data

US 2006/0064497 A1   Mar. 23, 2006

Related U.S. Application Data

(60) Provisional application No. 60/611,868, filed on Sep. 21, 2004.

(51) Int. Cl.
*G06F 15/173* (2006.01)
(52) U.S. Cl. .................................................. 709/226
(58) Field of Classification Search .................. 709/226, 709/223
See application file for complete search history.

(56) References Cited

U.S. PATENT DOCUMENTS

| | | | |
|---|---|---|---|
| 6,330,231 B1 | 12/2001 | Bi | |
| 7,203,183 B2 * | 4/2007 | Cromer et al. | 370/338 |
| 7,356,584 B2 * | 4/2008 | Yip | 709/224 |
| 7,509,129 B2 * | 3/2009 | Sinivaara | 455/453 |
| 2002/0054567 A1 | 5/2002 | Fan | |
| 2003/0120817 A1 | 6/2003 | Ott et al. | |
| 2003/0142651 A1 * | 7/2003 | Matta et al. | 370/338 |
| 2003/0210672 A1 | 11/2003 | Cromer et al. | |
| 2004/0001467 A1 | 1/2004 | Cromer et al. | |
| 2004/0013128 A1 | 1/2004 | Moreton et al. | |

OTHER PUBLICATIONS

A. Balachandran et al., "Characterizing User Behavior and Network Performance in a Public Wireless LAN," Proc. of ACM SIGMETRICS, 2002, pp. 195-205.
D. Kotz and K. Essien, "Analysis of a Campus-Wide Wireless Network," Proc. ACM MobiCom, 2002, pp. 107-118.
S-T. Sheu and C-C. Wu, "Dynamic Load Balance Algorithm (DLBA) for IEEE 802.11 Wireless LAN," Tamkang J. of Science and Engineering, vol. 2, No. 1, 1999, pp. 45-52.
A. Balachandran et al., "Hot-Spot Congestion Relief in Public-Area Wireless Networks," SIGCOMM Comput. Commun. Rev., 32(1):59-59, 2002.
J. Kleinberg, et al. "Fairness in Routing and Load Balancing," IEEE FOCS, 1999, pp. 568-578.
S. Lu, et al. "A Wireless Fair Service Algorithm for Packet Cellular Networks," Proc. ACM MobiCom, Oct. 1998, pp. 10-20.

* cited by examiner

*Primary Examiner*—Philip C Lee
*Assistant Examiner*—Esther Benoit
(74) *Attorney, Agent, or Firm*—Wall & Tong, LLP

(57) ABSTRACT

Association control is utilized for associating wireless local area network users with at least one wireless local area network access point and thereby achieving simultaneous fairness and load balancing. In the present method, a network operation center receives user parameters from each user in the wireless network via the access points. It then sets out both to determine a set of associations between each user and one or more access points based on the user parameters using fractional load balancing and produce a second set of associations by rounding so that, in said second set, each user is associated with only one access point. The present method achieves close to optimal load balancing and max-min fairness while outperforming commonly-used heuristic approaches.

17 Claims, 6 Drawing Sheets

(A) THE WIRELESS SYSTEM DESCRIPTION (B) A FAIR ASSOCIATION WHERE B=1 FOR EACH USER.

(C) THE MAX-MIN FAIRNESS SINGLE ASSOCIATION (D) THE MAX-MIN FAIRNESS MULTIPLE ASSOCIATION (A) AN UNFAIR ASSOCIATION.

(B) THE OPTIMAL ASSOCIATION.

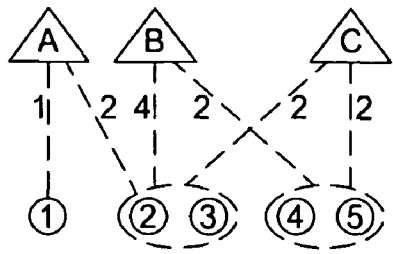
(A) THE WIRELESS SYSTEM DESCRIPTION
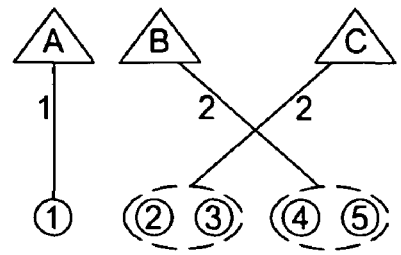
(B) A FAIR ASSOCIATION WHERE B=1 FOR EACH USER.
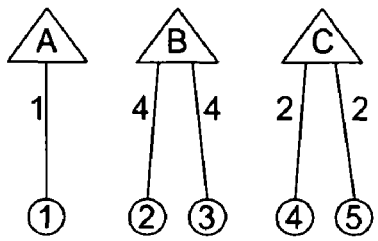
(C) THE MAX-MIN FAIRNESS SINGLE ASSOCIATION
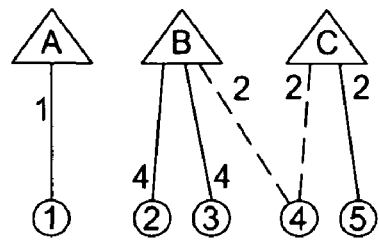
(D) THE MAX-MIN FAIRNESS MULTIPLE ASSOCIATION
FIG. 3
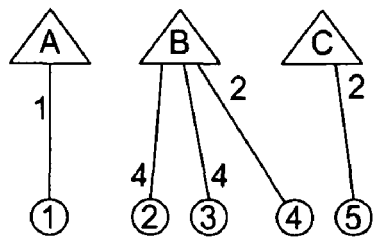
FIG. 4

```
Alg Integral_Load_Balancing(A,U)
    X^frac ← Fractional_Load_Balancing(A,U)
    X^int ← Rounding(X^frac)
    return X^int
end
```

FIG. 5

```
Alg Fractional_Load_Balancing (A,U)
    Initialize X
    k ← 1
    while (U ≠ ∅) do
        { L_k, F_k X_k } ← bottleneck_detection(A,U)
        Update X with the association X_k.
        A ← A − L_k
        U ← U − F_k
        k ← k + 1
    end of while
    return X
end
```

FIG. 6

```
Routine bottleneck_detection (A,U)
    Use LP1 to calculate Ỹ.
    Use LP2 to calculate an association X.
    Construct a graph G = (V, E).
    Color each AP a black if Ya = Ỹ.
    Color each AP a white if Ya < Ỹ.
    while exist (a,b) ∈ E and a is black and b is white do
        Color AP a white.
    end while
    L̃ ← { a | a is colored black}
    F̃ ← {u | ∃ x a,u > 0 ∧ a ∈ L̃ }
    X̃ ← the association of F̃ and L̃
    Return { L̃, F̃, X̃}
end
```

FIG. 7

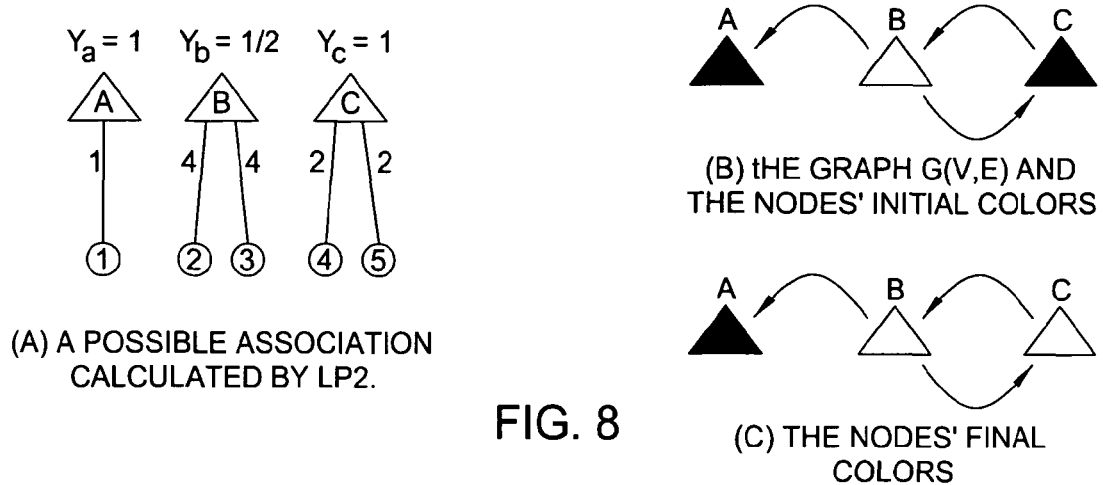

(A) A POSSIBLE ASSOCIATION CALCULATED BY LP2.

(B) tHE GRAPH G(V,E) AND THE NODES' INITIAL COLORS (C) THE NODES' FINAL COLORS

FIG. 8

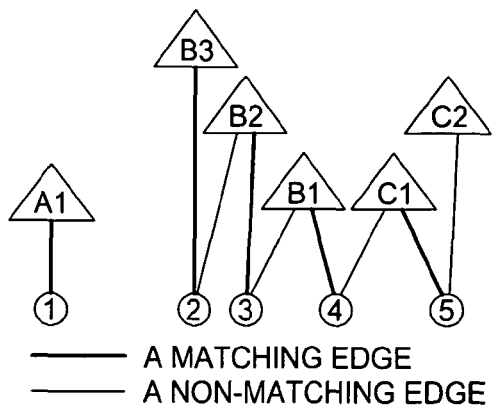

——— A MATCHING EDGE
——— A NON-MATCHING EDGE

FIG. 9

```
Alg Online_Load_Balancing (A, U, u)
    if (elapsed time from last offline optimization > T) than
        Integral_Load_Balancing (A, U ∪ u)
        Yoffline ← max_a ∈ A Ya
    else
        a ← AlgorithmByAAFPW (A, u)
        Yonline ← max_a ∈ A Ya
        if (Yonline - Yoffline > Δ) then
            Integral_Load_Balancing (A, U ∪ u)
        else
            assign u to AP a
end
```

FIG. 10

FAIRNESS AND LOAD BALANCING IN WIRELESS LANS USING ASSOCIATION CONTROL

CROSS-REFERENCE TO RELATED APPLICATION

This application claims the benefit from commonly owned U.S. Provisional Patent Application Ser. No. 60/611,868 filed on Sep. 21, 2004, which is incorporated by reference herein in its entirety.

FIELD OF THE INVENTION

This invention relates to the field of wireless communications and, more specifically, to a method for load balancing in wireless local area networks.

BACKGROUND OF THE INVENTION

In recent years, IEEE 802.11 wireless local area networks (WLANs) have been rapidly deployed in enterprises, public areas and homes. Recent studies on operational WLANs have shown that user load is often distributed unevenly among wireless access points (APs). In current WLANs, each user scans the wireless channel in order to detect its nearby access points and then to associate itself with the access point that has the strongest received signal strength indicator (RSSI), while ignoring the load on the access point. As users are typically not uniformly distributed, most of them may be associated with just a few access points in a network, while adjacent or nearby access points may carry a light load or even be idle. This load imbalance among access points is undesirable because it hampers the network from providing satisfactory service to its users. Studies show that the problem can be alleviated by balancing the load among the access points.

Vendors of WLAN products have incorporated load balancing features in their network device drivers, access point firmware, and WLAN cards. In some of these proprietary solutions, the access points broadcast their load to users in their vicinity in the beacon messages thereby allowing each user to choose the least loaded access point. In other proposed techniques, rather than using the RSSI as the association criteria, the rules define different metrics and associate each user with the access point that optimizes these metrics. These metrics typically take into account factors such as the number of users currently associated with an access point, the mean RSSI of users currently associated with an access point, the RSSI of the new user, and the bandwidth a new user can obtain if it is associated with a particular access point. For example, new users are associated with the access point that can provide a minimal bandwidth required by the user. If there are multiple such access points available to a user, then the access point with the strongest signal is selected. Most of these techniques only determine the association of newly arrived users without redistributing or reassociating existing users on that access point. But one known technique proposes reassociation of users periodically each time some bandwidth thresholds are violated.

Load balancing has also been considered in cellular networks, both TDMA and CDMA networks. Usually, it is achieved via dynamic channel allocation techniques. These methods are not applicable in the WLAN environment where each access point normally uses one channel and channel allocation is fixed. These methods are also not applicable to CDMA packet data networks. Another approach for load balancing is to use cell overlapping to reduce the blocking probability of calls and maximize the network utilization. For example, a newly arrived mobile station is associated with the base station with the greatest number of available channels. Fairness in this type of approach has been addressed by restricting the number of available channels for new calls that are made in overlapping areas. It has also been proposed that the channel conditions of mobile stations associated with a base station be considered. Load balancing integrated with coordinated scheduling technique has been studied for CDMA networks.

Although many techniques exist for balancing loads in wireless networks, none of the known techniques provide a suitably fair technique for load balancing and none provide a guarantee on the bandwidth allocated to each user. Fair load balancing with a concomitant bandwidth allocation guarantee is absent from all the known techniques.

SUMMARY OF THE INVENTION

Operational wireless LANs (WLANs) have exhibited a user load that is often unevenly distributed among wireless access points (APs). This unbalanced load results in unfair bandwidth allocation among users. Unbalanced load and unfair bandwidth allocation can be greatly alleviated by intelligently associating users to access points, so-called association control, rather than allowing users to greedily associate access points with best received signal strength.

In accordance with the principles of the present invention, fair load balancing is accomplished by a comprehensive association control scheme that provides guarantees on the quality of the bandwidth allocation against the optimal solution. This technique allows users to achieve reasonably good connections compared with the strongest received signal approach, when load-balancing is not done carefully in the latter. From experimental practice, it is shown that the present method achieves close to optimal load balancing and max-min fairness while outperforming commonly-used heuristic approaches.

The present method determines the user-AP associations that ensure max-min fair bandwidth allocation across the entire network. This method balances the load on the access points. It indicates the strong correlation between fairness and load balancing, which enables the use of load balancing techniques for obtaining near optimal max-min fair bandwidth allocation.

In this method, a fractional load balancing solution is computed wherein users can be associated with multiple access points simultaneously. This fractional load balancing solution guarantees the fairest bandwidth allocation in terms of max-min fairness. By utilizing a rounding method, an efficient integral association is obtained. In particular, a 2-approximation method is provided for unweighted greedy users and a 3-approximation method for weighted and bounded-demand users.

Time fairness is considered in addition to bandwidth fairness for the users. The method is further extended for the on-line case where users may join a WLAN for a period of time and then leave that WLAN.

BRIEF DESCRIPTION OF THE DRAWINGS

The teachings of the present invention can be readily understood by considering the following detailed description in conjunction with the accompanying drawings, in which:

FIGS. 3a-d depict a simplified version of the system of FIG. 1 exhibiting different types of user-AP associations;

FIG. 4 shows the system of FIG. 3a exhibiting a single association that is min-max load balanced while not man-min fair;

FIG. 5 shows a formal programming description of the integral load balancing method in accordance with the principles of the present invention;

FIG. 6 shows a formal programming description of the fractional load balancing method in accordance with the principles of the present invention;

FIG. 7 shows a formal programming description of the bottleneck detection method in accordance with the principles of the present invention;

FIGS. 8a-c show a simplified version of the system of FIG. 3a exhibiting execution of the bottleneck detection method from FIG. 7;

FIG. 9 shows an exemplary network graph with matching and non-matching edges;

FIG. 10 shows a formal programming description of the online load balancing method in accordance with the principles of the present invention;

DETAILED DESCRIPTION OF THE INVENTION

Figure 1:
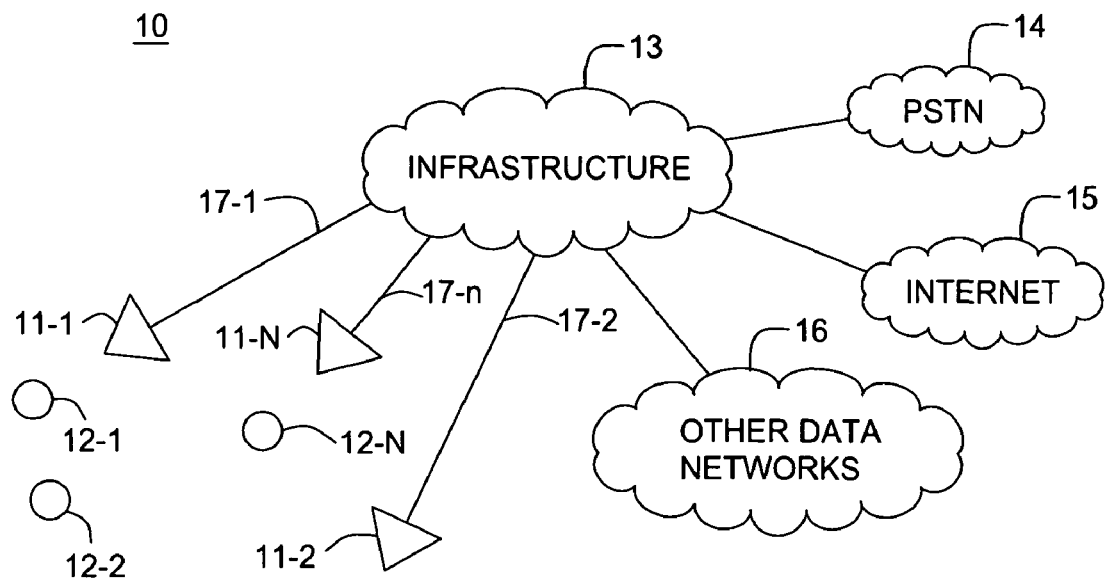
FIG. 1 depicts a simplified block diagram of a wireless local area network interconnected to other wired networks via a fixed infrastructure.

Operational wireless LANs (WLANs) have exhibited a user load that is often unevenly distributed among wireless access points (AP). This unbalanced load results in unfair bandwidth allocation among users. Unbalanced load and unfair bandwidth allocation can be greatly alleviated by intelligently associating users to access points, so-called association control, rather than allowing users to greedily associate access points with best received signal strength.

The method described below determines the user-AP associations that ensure max-min fair bandwidth allocation across the entire network. This method balances the load on the access points. A rigorous formulation is presented below for the association control problem that considers bandwidth constraints of both the wireless and backhaul links. The consideration of backhaul links is motivated by the fact that some WLAN deployments utilize low capacity backhaul links for connecting the access points to a fixed backbone, e.g., T1 lines. In accordance with the principles of the present invention, the method indicates the strong correlation between fairness and load balancing, which enables the use of load balancing techniques for obtaining near optimal max-min fair bandwidth allocation. Since this problem is NP-hard, methods are presented that achieve a constant-factor approximate max-min fair bandwidth allocation.

First, a fractional load balancing solution is computed wherein users can be associated with multiple access points simultaneously. This solution guarantees the fairest bandwidth allocation in terms of max-min fairness. Then, by utilizing a rounding method an efficient integral association is obtained. In particular, a 2-approximation method is provided for unweighted greedy users and a 3-approximation method for weighted and bounded-demand users. In addition to bandwidth fairness, time fairness is considered and shown to be solved optimally. The method is further extended for the on-line case where users may join a WLAN and then leave. From experimental practice, it will be demonstrated below that the methods achieve close to optimal load balancing and max-min fairness and they outperform commonly used heuristic approaches.

Previous studies in WLANs and cellular networks have not considered fairness in conjunction with load balancing. It has now been determined in the experimental practice of this invention that, if load-balancing is not done carefully, users may experience even poorer connections compared with the strongest received signal approach. In accordance with the principles of this invention, this is the first presentation of a comprehensive association control scheme that provides guarantees on the quality of the bandwidth allocation against the optimal solution. This technique can be used as the theoretical foundation of practical network management systems.

In the method described below, each mobile device is equipped with a client-based element, which is provided in the form of hardware, software, firmware or a combination thereof, for monitoring the wireless channel quality that the user experiences from each one of its nearby access points. Information about the wireless channel quality monitored by each user comprises, illustratively, the effective bit rate calculated from the signal strengths of the Access Point beacons. A user can associate with an AP (say A) initially, feedback the effective bit rate to the NOC through AP A. Pursuant to this dissemination of information from the NOC, the users switch their associations. The NOC is not explicitly shown in FIG. 1, but it is commonly understood to be included in the infrastructure 13. The NOC includes a mechanism, such as server-based software or the like, for obtaining the monitored channel quality from the users and their access points.

It should be noted with respect to the embodiment of the method provided below that the present invention does not address the issue of providing fair service for users associated with a given access point. It is assumed that such a mechanism is already deployed at each access point, for instance, by using the emerging IEEE-802.11-e extension such as Q. Ni et al., "*Issues and Enhancements for IEEE 802.11 Wireless LAN,*" Technical Report RR-461, INRIA, France, November 2002 or any fair scheduling mechanism such as is shown in P. Ramanathan et al., "*Adapting packet fair queuing methods to wireless networks,*" in Proc. ACM MobiCom, pages 1-9 (October 1998), or S. Lu et al., "*A wireless fair service method for packet cellular networks,*" in Proc. ACM MobiCom, pages 10-20 (October 1998) or M. Buddhikot et al., "*Integration of 802.11 and third-generation wireless data networks,*" in Proc. IEEE INFOCOM (March 2003). The association control technique described herein in accordance with the principles of the present invention is actually a broader technique provided in addition to the fair service mechanisms mentioned above that are already deployed in access points.

It is understood by persons skilled in the art that association control can be used to achieve different objectives. For instance, it can be used to maximize the overall system throughput by shifting users to idle or lightly loaded access points. Although this plausible objective can be obtained by each access point serving only its associated user with maximal data rate, this is clearly not a desired system behavior. A more desirable goal is to provide network-wide fair bandwidth allocation among users independent of their locations, while maximizing the fair share of each user. This type of fairness is known as max-min-fairness. Informally, it can be said that an allocation of bandwidth through user-AP association is max-min fair if there is no way to give more bandwidth to any user without decreasing the allocation of a user with less or equal bandwidth. To achieve this objective, the methods described herein below ensure max-min fair bandwidth allocation among users while balancing the load on the access points.

In order to understand the principles of the present invention, a new formal definition is formulated for the load of an access point. It is believed that no such common notion exists in the literature. Several studies have already shown the existence of naive definitions such as the number of users that are associated with an access point or the access point throughput. But these definitions do not reflect the access point load.

As an introduction to the new more rigorous definition of the load of an access point in WLANs, it can be stated that the load that a user generates on its associated access point is inversely proportional to their effective bit rate. The new definition enables the proof of a strong correlation between balancing the load on the access points and providing fair service to the users. Moreover, it allows a rigorous formulation of the association control problem. Since the latter is NP-hard, several approximation methods have been developed for different settings of the fair service problem. Intuitively, the present method could be expected to guarantee to each user a bandwidth of at least $1/\rho$ of the bandwidth that it receives in the optimal (integral) solution, for a constant $\rho \geq 1$. However, due to the unbounded integrality gap, it is impossible to provide this type of approximation. Accordingly, the guarantees relating to the present method are relative to an optimal fractional solution, where users can be associated with multiple access points simultaneously. As stated above, a fractional load balancing solution is calculated that guarantees a max-min fair bandwidth allocation. It is the fairest among all allocations and it is used as the basis to compare with the integral solution. Then a rounding method is utilized to obtain an efficient solution where each user can only associate with one access point. In particular, a 2-approximation method is provided for unweighted greedy users and a 3-approximation method is provided for weighted and bounded-demand users. In addition to bandwidth fairness, time fairness is considered and an optimal method is presented. The technique is extended to cover the online case where users may join and leave. Simulations of the inventive method demonstrate that it achieves close to optimal load balancing and max-min fairness and outperforms popular heuristic approaches. Furthermore, these simulations show that in the presence of hot-spots the inventive method also provides higher network utilization than the one obtained by the strongest signal approach. Although, this method is explained and presented in the context of WLAN management, the methods described herein are applicable to cellular networks as well.

System and Network Description

As shown in FIG. 1, a simplified IEEE 802.11 based wireless LAN (WLAN) 10 that comprise a large number of access points 11 that serve a community of users 12. The notation A is used to denote the set of access points and m is used to denote their number, i.e. $m=|A|$. All the access points 11 are attached via transmission links 17 to a fixed infrastructure 13, which in turn connects the access points to networks such as the public switched network (PSTN) 14, the Internet 15, and other networks 16. This infrastructure provides to each access point $a \in A$ a fixed transmission bit rate of $R_a$ bits/second. Each access point has a limited transmission range and can serve only users 12 that reside, permanently or temporarily, in that range. The network coverage area is then defined as the union of the area covered by each access point in A. The notation U is used to denote the set of mobile users 12 that reside in the network coverage area and $n=|U|$ is used to denote the total number of users in U. It is assumed that the users have a quasi-static mobility pattern. In other words, the users are free to move from place to place, but they tend to stay in the same physical locations for long time periods. Each user is associated with a single access point to obtain connectivity service over a wireless channel. The channel condition between an access point and a user is dynamic. However, since the objective of the present invention is to achieve a long-term fairness, the decisions on load balancing are based on the long-term channel conditions observed by the users and the access points. The latter are mainly influenced by path loss and slow fading. Long-term time scale is measured in terms of tens of seconds, which is still reasonable for all practical purposes in this wireless environment. For each user $u \in U$ and each access point $a \in A$, the notation $r_{a,u}$ is used to denote the average effective bite rate with which users and access points can communicate. It should be understood that the effective bit rate also takes into account the overhead of retransmissions due to reception errors.

For the purposes of this description, the user community can be described in terms of two types of users: greedy users and bounded-demand users. Greedy users are considered to be those users that consume all the bandwidth allocated to them by the network and always have traffic to send or receive. Furthermore, it is assumed that each user $u \in U$ has a weight $w_u$ that specifies its priority. This weight is used to determine the bandwidth allocation, $b_u$, the particular user is entitled to have with respect to the other users. For instance, a user $u \in U$ entitles to have a bandwidth of $$b_u = \frac{w_u}{w_v} \cdot b_v$$

of any other user $v \in U$ in a nearby location. Bounded-demand users are defined to be those users that have specific maximal bandwidth demands, $d_u$, that serve as an upper bound to their bandwidth needs. It is assumed that, each access point operates a scheduling method that allocates bandwidth fairly to its associated users, e.g., by using one of the mechanisms described in the Ni et al. and Buddhikot et al technical papers referenced above.

In accordance with the principles of the present invention, the description below presents a practical method that determines the appropriate user-AP association for providing a long-term max-min fair service to all the mobile users. As such, this method can be used as the foundation in the design of practical network management systems without deviating from or requiring changes to the present IEEE 802.11 standards. It is well known that data flows have bursty characteristics and these data flows generate dynamic load on the access points. Therefore, it is practically impossible to provide short-term fairness through association control to the users in multiple-AP networks without generating high communication overhead and disrupting ongoing sessions. Consequently, the present scheme addresses the need to provide long-term fairness in both the worst and average case without interfering with the network operation. By using the greedy user model, the present scheme maximizes the minimal bandwidth allocated to each user in worst case scenarios. Moreover, the bounded demand model can be used to maximize the average throughput that each user experiences in a fair system. In other words, the present method takes into account the difference between users' average demands and balances their load among the access points. This makes sure that users with high average bandwidth requirements will be evenly distributed among the access points.

Main implementation aspects of an association control system are described below. First, the system (NOC) requires relevant information on each user u∈U, such as its weight $w_u$, its average bandwidth demand $d_u$ and the effective bit rate $r_{a,u}$ that it experiences from each access point a∈A. Second, it needs a method to determine the appropriate user-AP association. Third, the system needs a mechanism to enforce these association decisions.

It is understood at present that the required information, mainly the effective bit rate $r_{a,u}$ between every user u and every access point a is not available from the existing 802.11 access point products, because an access point maintains the bit rate information only for the users which are currently associated with the particular access point. In fact, the effective bit rates can only be measured from the user side, by monitoring the signal strength of beacons from nearby access points. To this end, it is understood that, as part of the implementation of the present invention, every user computer is equipped with client software that periodically collects the bit rate information and evaluates its average bandwidth demand in a straightforward manner that is well known in the art. The collected information is reported by each user via the access points to the network operation center (NOC) that operates the inventive method to determine the appropriate user-AP association decisions consistent with fairness and load balancing. Since the users are free to move, the NOC periodically recalculates the optimal user association by using one of the offline methods, described below. Between two successive executions of an offline method, the NOC uses an online method, described below, that maintains the access points' load as balanced as possible. After determining a user association, the NOC notifies the user client software of the new user-AP association decision. The client then changes the user association in accordance with the new decision.

Figure 2:
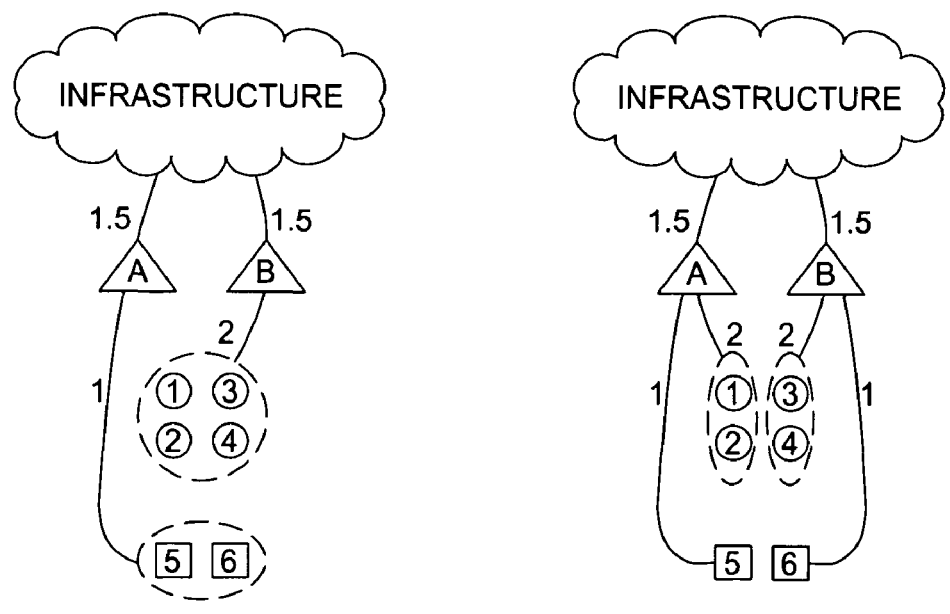
FIG. 2 depicts a simplified version of the system of FIG. 1 exhibiting bottlenecks over the wireless and wired channels.

It is commonly believed that, in wireless systems, the wireless channels are the scarce resources that determine the bandwidth allocation. Although this is true in many cases, there are many WLANs where this assumption is not valid. For instance, consider an IEEE 802.11 network where the access points are connected to the infrastructure over T1 lines, with capacity around 1.5 Mbps, as illustrated in the example described below and shown in FIG. 2. It is understood that, in practice, T1 lines are commonly used as the access link that connects small and medium companies to the Internet. From the description below, the example in FIG. 2 will be understood to demonstrate the need to consider both the wireless and the wired channel when calculating load balanced associations.

A wireless system is shown in FIGS. 2a and 2b with two (2) access points, labeled a and b and shown as triangles, and six (6) users, enumerated from 1 to 6 and shown as circles and squares. Users 1, 2, 3, and 4 experience a bit rate of 2 Mbps (shown adjacent to the communication path) from both access points, while users 5 and 6 have a bit rate of 1 Mbps from both access points. The access points are connected to a fixed network with T1 lines with transmission capacity of 1.5 Mbps.

In the following section, two possible associations are considered and the average bandwidth that the access points provide to the users is analyzed. The first association is a fair user association only from the wireless perspective as shown in FIG. 2a. The second user-AP association is a fair user association in general as shown in FIG. 2b.

As shown in FIG. 2a, the method in this exemplary system can allocate a bandwidth of 0.5 Mbps to each user over the wireless links. However, while access point can allocate a bandwidth of 0.5 Mbps to users 5 and 6 on its T1 line, access point can only provide ⅓ Mbps to its associated users over its T1 line. In this case, the wireless link of access point a is the bottleneck that affects the bandwidth allocation. Meanwhile, the wired link is the bottleneck of access point b.

As shown in FIG. 2b, this association provides a bandwidth of 0.5 Mbps to each user over the wired and wireless channels. In this case, different users may gain different service time on the wireless links and wired backhauls. For instance, user 5 captures ⅓ of the service time of the T1 link from access point a, while it is served ½ of the time by its wireless channel (a 2 Mbps channel) between it and access point a. This ensures that user 5 actually receives a bandwidth of 0.5 Mbps.

Fairness and Load Balancing

In the following section, formal definitions of fair bandwidth allocation and load balancing are presented. Additionally, some useful properties are provided for constructing the inventive method. For the sake of simplicity, these definitions are given only for greedy users. These definitions will be extended for bounded demand users in a later section.

Two association models are considered. The first is a single-association model, so-called an integral-association, where each user is associated with a single access point at any given time. This is the association mode that is known to be used in IEEE 802.11 networks. The second is a multiple-association model, also termed a fractional-association that allows each user to be associated with several access points and to get communication services from them simultaneously. A user may receive several different traffic flows from different access points, and its bandwidth allocation is the aggregated bandwidth of all of them. This latter model is required to develop the method for the integral-association case. For both association models, the notation $U_a$ is used to denote all the users that are associated with access point a∈A and the notation $A_u$ is used to denote the set of access points associated with a particular user u∈U.

In the wireless network shown in FIG. 1, a bandwidth allocation is a matrix, $B=\{b_{a,u}|u\in U, a\in A\}$ that specifies the average bandwidth, $b_{a,u}$, allocated to each user u∈U by every access point a∈A. The notation $b_u = \Sigma_{a \in A} b_{a,u}$ denotes the aggregated bandwidth allocated to user u and $\bar{b}_u = b_u/w_u$ denotes its normalized bandwidth (NB) allocation. For a bandwidth allocation B, $\bar{b}_u$ is the normalized bandwidth allocated to user u∈U. Then the normalized bandwidth vector (NBV), $\vec{B} = \{\bar{b}_1, \ldots, \bar{b}_n\}$ is defined as the users' normalized bandwidth allocations sorted in increasing order and users are renamed according to this order. On average, access point a is required to serve user u a period of $b_{a,u}/r_{a,u}$ over the wireless channel and a period of $b_{a,u}/R_a$ over the infrastructure link, at every time unit. Consequently, a bandwidth allocation B is said to be feasible if every access point a∈A can provide the required bandwidth to all its associated users both in the wireless and the wired domains, that is, $\Sigma_{u \in U} b_{a,u}/r_{a,u} \leq 1$ and $\Sigma_{u \in U} b_{a,u}/R_a \leq 1$. In the case of an integral-association, each user is required to be associated with a single access point.

Intuitively, a system provides a fair service if all users have the same allocated bandwidth. That is, the same normalized bandwidth in the case of weighted system. Unfortunately, such a degree of fairness may cause significant reduction of the network throughput, since all users obtain the same bandwidth allocation as the bottleneck users, as illustrated in the example shown in FIG. 3 and described below. The desired approach to address this issue of fair allocation that also maximizes the network throughput is to provide max-min fairness. Informally, a bandwidth allocation of a weighted system is called max-min fair if there is no way to increase the bandwidth of a user without decreasing the bandwidth of another user with the same or less normalized bandwidth.

A feasible bandwidth allocation B is called max-min fair if its corresponding NBV $\vec{B}=\{\bar{b}_1, \ldots, \bar{b}_n\}$ has the same or higher lexicographical value than the NBV $\vec{B}'=\{\bar{b}_1', \ldots, \bar{b}_n'\}$ of any other feasible bandwidth allocation B'. In other words, if $\vec{B} \neq \vec{B}'$ then there is an index j such that $\bar{b}_j > \bar{b}_j'$ and for every index i<j, it follows that $\bar{b}_i = \bar{b}_i'$.

As shown in FIGS. 3a-3d, a wireless system is depicted with 3 access points, A={a,b,c}, and 5 users, U={1,2,3,4,5}. In FIG. 3a, dotted lines represent possible user-AP associations and the number near each line represents the bit rate, $r_{a,u}$, of the corresponding wireless link. All the users have weight 1 and it is assumed that all the access points are connected to a high bandwidth infrastructure. FIG. 3b presents a feasible fair association in which every user receives a bandwidth b=1, where the solid lines represents the actual users' associations. It is understood that this is the maximal bandwidth that can be allocated to user 1. Thus, it can be argued that this is the optimal bandwidth allocation. However, in FIGS. 3c and 3d, two feasible associations are described in which each user get at least 1 unit of bandwidth. In the latter figures, the solid lines indicate an integral user-AP association and the dashed lines represent fractional associations. FIG. 3c presents the integral max-min fair allocation with NBV $\vec{B}=\{1,1,1,2,2\}$. While, FIG. 3d introduces the fractional max-min fair allocation with NBV $$\vec{B} = \left\{1, \frac{4}{3}, \frac{4}{3}, \frac{4}{3}, \frac{4}{3}\right\}.$$

Clearly, the NBV of a fractional max-min fairness allocation always has the same or higher lexicographical value than the NBV of the integral max-min fairness allocation. We will use this property to construct our solution for the integral-association case. Furthermore, consider a max-min bandwidth allocation B of either a fractional or an integral association. The users can be divided into fairness groups, such that each fairness group, $F_k \subseteq U$ consists of all users that experience the same normalized bandwidth allocation, denoted by $\bar{b}_k$.

It can be shown that if B is a max-min fair bandwidth allocation and $\{F_k\}$ is its corresponding fairness groups, then all the users served by a given access point belongs to the same fairness group. That is, for each fairness group $F_k$, $\cup_{u \in F_k} \cup_{a \in A_u} U_a = F_k$. First, it is shown that $\cup_{u \in F_k} \cup_{a \in A_u} U_a \supseteq F_k$. This is trivial since every user $u \in F_k$ is included in the set $U_a$ for each access point α it is associated with. It can be shown that $\cup_{u \in F_k} \cup_{a \in A_u} U_a \subseteq F_k$. This is satisfied in the case of an integral association because each user is associated with a single access point and this access point guarantees the same normalized bandwidth allocation to all its associated users. For the sake of the proof, it is assumed that this property is not valid for fractional-association. Under this assumption, there is an access point a that serves users of two different fairness groups $F_j$ and $F_i$. Suppose that $\bar{b}_j < \bar{b}_i$. Then, access point a may increase the bandwidth of its associated users in $F_j$ on behalf of its associated users in $F_i$. This results in a NBV with a higher lexicographical value. However, this contradicts the assumption that the given allocation is max-min fair.

Balancing the load on the access points is one approach for obtaining a fair service. However, as mentioned above, the notion of load is not well defined for WLANs. Neither the number of users associated with an access point nor its throughput reflects the load on the access point. Intuitively, the load of an access point needs to reflect its inability to satisfy the requirements of its associated users and as such it should be inversely proportional to the average bandwidth that they experience. The present load definition captures this intuitive notion and is aligned with the standard load definition that is used in the computer science relating to scheduling of unrelated parallel machines. Consequently, this allows the extension of existing load balancing techniques to balance the access point loads and thereby obtain a fair service.

A fractional association is a matrix $x=\{x_{a,u} | a \in A \wedge u \in U\}$, such that for each user $u \in U$, the summation $\Sigma_{a \in A} x_{a,u} = 1$ holds. Each parameter $x_{a,u} \in [0,1]$ specifies the fractional association of user u with access point a. Generally speaking, $x_{a,u}$ reflects the fraction of user u's total flow that it expects to get from access point a. A fractional association x is termed feasible if the users are associated only with access points that can serve them, i.e., for each pair $a \in A$ and $u \in U$, it follows that $x_{a,u} > 0$ only if $r_{a,u} > 0$. Moreover, a feasible association matrix that consists of just the numbers 0 and 1 is termed an integral association.

Consider a feasible association x, either integral or fractional. The load induced by user u on access point a is defined to be the time that is required of access point a to provide a traffic volume of size $x_{a,u} \cdot w_u$ to user u. Thus, user u produces a load of $x_{a,u} \cdot w_u / r_{u,a}$ on the wireless channel of access point a and a load of $x_{a,u} \cdot w_u / R_a$ on its backhaul link. Consequently, the load, $y_a$ on access point a is defined to be the period of time that it takes access point a to provide a traffic volume of size $x_{a,u} \cdot w_u$ to all its associated users $u \in U_a$. The load on an access point $a \in A$, denoted by $y_a$, is the maximum of its aggregated loads on both its wireless and infrastructure links produced by all the users. Thus, the load on access point a is given by:

$$y_a = \max\left\{\sum_{u \in U} \frac{x_{a,u} \cdot w_u}{r_{u,a}}, \sum_{u \in U} \frac{x_{a,u} \cdot w_u}{R_a}\right\}.$$

Therefore, the load of an access point is given in terms of the time it takes to complete the transmission of certain traffic volume from each associated user. This is not surprising, since the load should be inversely proportional to the bandwidth that the access point provides to its users. Furthermore, the bandwidth that access point a provides to user u is $$b_{a,u} = x_{a,u} \cdot w_u / y_a \qquad (1)$$

The load vector $\vec{Y}=\{y_1, \ldots, y_m\}$ of an association matrix x is defined to be the n-tuple consisting of the load of each access point sorted in decreasing order. A feasible association x is termed min-max load balanced if its corresponding load vector $\vec{Y}=\{y_1, \ldots, y_m\}$ has the same or lower lexicographical value as any other load vector $\vec{Y}'=\{y_1', \ldots, y_m'\}$ of any other feasible assignment x'. In other words, if $\vec{Y} \neq \vec{Y}'$, then there is an index j such that $y_j < y_j'$ and for every index i<j, it follows that $y_i = y_i'$.

For the example shown in FIG. 3c, the min-max load balanced association for the single-association case and its load vector is $$\vec{Y} = \left\{1, 1, \frac{1}{2}\right\}.$$

While, the example shown in FIG. 3d introduces the min-max load balanced association for the multiple-association case and its load vector is $$\vec{Y} = \left\{1, \frac{3}{4}, \frac{3}{4}\right\}.$$

In this case, the association of user 4 is $x_{b,4}=x_{c,4}=\frac{1}{2}$, thus the load that this association induces on each one of these access points is $$\frac{1}{2} \times \frac{1}{2} = \frac{1}{4}.$$

There is a min-max balanced association x and a corresponding load vector $\vec{Y}$. While users can be partitioned into fairness groups, access points can be partitioned into load groups. Each load group, $L_k \subseteq A$ contains all the access points with the same load, denoted by $y_k$. Furthermore, it is assumed that the indices of the load groups are assigned in decreasing order according to their corresponding loads. It can be shown that, for a min-max load balanced association x, where access points are partitioned into load groups $\{L_k\}$, each user is associated with access points with the same load, i.e., for each load group $L_k$ we have $\cup_{a \in L_k} \cup_{u \in U_a} A_u = L_k$.

It can also be shown that, for a min-max load balanced association x and any user $u \in U$ and any one of its associated access points $a \in A_u$, the bandwidth allocation for user u determined by x is $b_u = w_u/y_a$: Since x is a min-max load balanced association, it follows that $\Sigma_{q \in A_u} x_{q,u} = 1$ and all the access points $q \in A_u$ has the same load $y_a$ as the selected access point a. Then, the bandwidth is expressed as, $$b_u = \sum_{q \in A_u} b_{q,u} = \sum_{q \in A_u} x_{q,u} \cdot w_u / y_q = w_u / y_a.$$

For a min-max load balanced association x, x partitions the access points into load groups $\{L_k\}$, where the load on each access point in a group $L_k$ is $y_k$. It also divides the users into fairness groups $\{F_k\}$ such that all the users in the same group experience the same normalized bandwidth $\bar{b}_k$. Furthermore, the access points of a given load group $L_k$ serve only users from a corresponding fairness group $F_k$ and the normalized bandwidth that each user in $F_k$ experiences is $1/y_k$.

For the following description, the load group of the most loaded access points and the corresponding fairness group are referred to as the bottleneck groups. It will be shown below that there is a strong relationship between fairness and load balancing in the case of fractional-association. In the fractional-association case, a min-max load balanced association x defines a max-min fair bandwidth allocation and vise versa.

Association Control of Greedy Users

In this section, methods are presented that give approximate solutions to the integral max-min fair bandwidth allocation for greedy users. This is a challenging problem, as even identifying the users in the bottleneck fairness group and finding their normalized bandwidth is NP-hard. From the description above, it follows that the minimal normalized bandwidth allocation is maximized when the maximal load on the access points is minimized, i.e., when the load on the access points is balanced. Unlike the solutions given in the prior art that balance the load on the most loaded machines, the present method in accordance with the principles of the present invention seeks for a complete min-max load balanced association. Three different settings are considered: a 2-approximation method for unweighted users, a 3-approximation method for weighted users, and an optimal solution for fair time allocation.

Intuitively, the method should be formulated to guarantee to each user a bandwidth of at least $1/\rho$ of the bandwidth that it receives in the optimal integral solution, for a constant $\rho \geq 1$. However, due to the unbounded integrality gap, it is impossible to provide this type of approximation. For $y_a^{int}$ and $y_a^{frac}$ as the loads on a given access point $a \in A$ in the optimal integral and fractional solutions, respectively, it can be shown that there is neither an upper constant bound nor a lower constant bound for the ratio $y_a^{int}/y_a^{frac}$. For example, a wireless network includes 2 access points $\{a,b\}$ and 2 users $\{1,2\}$, where $r_{a,1}=r_{b,1}=c$ and $r_{a,2}=r_{b,2}=c/(2(c-1))$ for a given constant $c>1$. In the optimal fractional solution, the load on each access point is $y_a^{frac}=y_b^{frac}=\frac{1}{2} \cdot (1/c+(2c-1)/c)=1$. However, in any integral solution, an access point a experiences a load of $y_a^{int}=1/c$ while the other has a load of $y_b^{int}=(2c-1)/c$. Consequently, the ratio is $y_a^{int}/y_a^{frac}=1/c$ and it cannot be lower bounded by any constant. This example demonstrates the difficulty in providing guarantees that are comparable with the integral solution. Accordingly, the guarantees in the inventive method are relative to an optimal fractional solution. Since the NBV of the latter has the same or higher lexicographical value as the NBV of the optimal integral solution, the fractional solution is at least as fair as an integral one. In fact, the optimal fractional solution is the fairest among all feasible allocations.

In a further example, a wireless network includes m access points, denoted by A, and a single user u, and $r_{a,u}=1$ for each $a \in A$. In the fractional solution, the load of user u is equally divided among all the access points and thus for each $a \in A$, it follows that $y_a^{frac}=1/m$. However, in the integral solution, user u is associated with a single access point a and the load of this access point is $y_a^{int}=1$. Thus, the ratio between the fractional and integral loads is $y_a^{int}/y_a^{frac}=m$ and it cannot be upper bounded by any constant.

This obstacle occurs since the fractional load is smaller than the load induced by a single user on any access point. Since, the practical goal of this approach is to reduce the load of highly-loaded access points, there is no need to balance the load of access points with load below a certain threshold T. To this end, T is selected to be the maximal load that a user may generate on an access point as formulated below as, $$T = \max_{\{u,a | u \in U \wedge a \in A \wedge r_{a,u} > 0\}} \max\left\{\frac{w_u}{r_{a,u}}, \frac{w_u}{R_a}\right\} \quad (2)$$

T is indeed a very small value and in practical 802.11 networks $T \leq 1$ sec/Mb. In light of these difficulties, load and bandwidth guarantees can be formulated.

If x* is a fractional min-max load balances association and y*$_a$ be the load of each access point a∈A, then a ρ* min-max load balanced approximation with threshold T is an integral association x such that the load y$_a$ of each access point a∈A satisfies y$_a$≦ρ·max{y*$_a$, T}. If x* be a fractional max-min fair association and $\bar{b}_u$* be its normalized bandwidth allocation to user u∈U, then a ρ* max-min fairness approximation with threshold T is an integral association x such that the normalized bandwidth $\bar{b}_u$ of each user u∈U satisfies $$\bar{b}_u \geq \frac{1}{\rho} \cdot \min\left\{\bar{b}_u^*, \frac{1}{T}\right\}.$$

The description that follows covers the integral load balancing method. The method comprises two steps: initially, the optimal fractional association is calculated also known as the min-max load balanced fractional association, then the method utilizes a rounding technique to obtain an approximate max-min fair integral association. From the description above, it follows that this association is also a min-max fairness fractional allocation. A formal description of the method is provided in FIG. 5. As shown in the formal description of the integral load balancing method in FIG. 5, the method is performed over the set of users U and access points A. This is shown by the entry Alg Integral-Load_Balancing(A,U). Fractional load balancing is then performed to develop the fraction load balanced association shown by the entry $x^{frac}$←Fractional_Load_Balancing(A,U). Rounding of the fractional load balanced association is performed to achieve the integral load balanced association shown by the entry $x^{int}$←Rounding($x^{frac}$) in FIG. 5. Finally, the integral load balanced association is returned and disseminated to the users.

The inventive method results from the observations made in description above dealing with fairness and load-balancing. More specifically, if x is a max-min load balanced fractional association, then x partitions the access points and the users into load groups {$L_k$} and corresponding fairness groups {$F_k$}, such that the access points in a load group $L_k$ are associated only with the users in a fairness group $F_k$ and vise versa. Moreover, all access points in a given load group $L_k$ have the same load $y_k$ and the corresponding users in the fairness group $F_k$ experience a normalized bandwidth allocation of 1/$y_k$. Based on these observations, an iterative method is obtained for calculating the load groups and their corresponding load values. This method is called the fractional load balancing method and is shown in FIG. 6. If it is assumed that the load groups are enumerated in decreasing order according to their loads $y_k$, then the access points in the group $L_1$ are the ones with the maximal load according to the association x. Group $L_1$ is known as the bottleneck load group and the set $F_1$ of their associated users is known as the bottleneck fairness group. Additionally, load $y_1$ on the access points in $L_1$ is called the bottleneck load and it is denoted by $\tilde{Y}$.

The iterative method detects the load groups according to their indices until all the users are associated with access points. At each iteration, the method invokes the bottleneck-group detection routine to calculate the bottleneck load and fairness groups and updates its current fractional solution accordingly. Before proceeding to the next iteration, the method removes the bottleneck load and fairness group from the system. IT should be noted that, in the new iteration, the load group with the succeeding index becomes the bottleneck group. A formal description of the method is given in FIG. 6. The fractional load balancing method is performed over the set of users U and the set of access points A as shown by the entry Alg Fractional_Load_Balancing(A,U). The method proceeds by initializing the load balanced association and by setting the subscript variable k to 1 as shown by the entries Initialize x and k←1. For a non-empty set of users U, the method iterates by performing the steps of bottleneck detection per the entry {$L_k$,$F_k$x$_k$}←bottleneck_detection(A,U) and updating the association x with the association $x_k$. Prior to iterating, the method removes the load group from the group of access points according to A←A–$L_k$; it removes the fairness group from the group of users according to U←U–$F_k$, and it increments the subscript variable by one as k←k+1. Once the iterations have been completed, the fractional load balancing method outputs the fractional min-max load balanced association x.

In the bottleneck-group detection routine, $\tilde{L}$ and $\tilde{F}$ denote the load and fairness bottleneck group, respectively. The bottleneck-group detection routine determines the load and the fairness bottleneck groups, $\tilde{L}$ and $\tilde{F}$, and their corresponding user-AP association in the fractional-association model. This routine consists of three steps. In the first step, the optimal bottleneck load value $\tilde{Y}$ is calculated. This value upper bounds the load $y_a$ of every access point a∈A in any min-max load balancing association. To infer its value, a linear program, denoted as LP1 and shown below, is utilized to calculate a feasible association x, which also minimizes the maximal load on all the access points over both their wireless and wired channels.

| LP1: | min $\tilde{Y}$ |
|---|---|
| subject to: | |
| ∀a ∈ A: | $\Sigma_{u \in U}(w_u \cdot x_{a,u})/r_{a,u} \leq \tilde{Y}$ |
| ∀a ∈ A: | $\Sigma_{u \in U}(w_u \cdot x_{a,u})/R_a \leq \tilde{Y}$ |
| ∀u ∈ U: | $\Sigma_{a \in A} x_{a,u} = 1$ |
| ∀u ∈ U, ∀a ∈ A: | $x_{a,u} \in [0, 1]$ |

LP1 minimizes the maximal load on all the access points. Consequently, the calculated association x ensures that the load on each access point in the bottleneck load group $\tilde{L}$ is exactly $\tilde{Y}$ and it also specifies the association of the access points in $\tilde{L}$ with the corresponding users in $\tilde{F}$. However, x does not optimize the load on the other access points, which may be as high as $\tilde{Y}$. In the worst case, LP1 may calculate a bad association such that the load on all the access points is $\tilde{Y}$ although the optimal association contains several load groups with lower loads, as illustrated in the following example.

For a wireless system as described above and shown in FIG. 3 with the association shown in FIG. 3b, this association induces a load of $\tilde{Y}$=1 on all the access points. However, from the example described earlier, it is known that a min-max fair allocation generates a load of ¾ on access point b and c. Accordingly, the allocated bandwidth to each of the associated users 2,3,4,5 is ⁴⁄₃.

Such association is very deceptive, since it gives the impression that all the access points are included in the bottleneck load group. Therefore, a method has been developed to separate the access points in the bottleneck load group $\tilde{L}$ from the rest of the access points. In the second step, an auxiliary linear program, LP2, is utilized to enables identification of whether some access points are not in $\tilde{L}$ or whether $\tilde{L}$ comprises all the access points. LP2 is based on the following property. The bottleneck load group $\tilde{L}$ contains all the access points if there is no feasible association such that: (1) Every access point has a load at most $\tilde{Y}$, and (2) Some access points have load strictly less than $\tilde{Y}$. LP2 is a linear program that looks for an association x that minimizes the overall load on all the access points subject to the constraint that the load on each access point is no higher than $\tilde{Y}$.

| LP2: subject to: | min $\Sigma_{a\in A}\, y_a$ |
|---|---|
| $\forall a \in A$: | $y_a \leq \tilde{Y}$ |
| $\forall a \in A$: | $\Sigma_{u\in U}(w_u \cdot x_{a,u})/r_{a,u} \leq y_a$ |
| $\forall a \in A$: | $\Sigma_{u\in U}(w_u \cdot x_{a,u})/R_a \leq y_a$ |
| $\forall u \in U$: | $\Sigma_{a\in A} x_{a,u} = 1$ |
| $\forall u \in U, \forall a \in A$: | $x_{a,u} \in [0, 1]$ |

Clearly, if the bottleneck load groups do not comprise all the access points, then LP2 should find an association where some access points have load strictly less than $\tilde{Y}$ and these access points are not included in $\tilde{L}$. However, LP2 does not specify the access points that are included in $\tilde{L}$, because access points with loads equal to $\tilde{Y}$ are not necessarily included in $\tilde{L}$, as illustrate in an example below. Consequently, in the third step, a method is introduced for separating $\tilde{L}$ from the other access points based on the results given in a definition above where the load of each access point $a \notin \tilde{L}$, $y_a = \tilde{Y}$, can be reduced by shifting the association of some of its associated users to less loaded access points.

Based on the association x determined by LP2, it is possible to build a directed graph G=(V,E) such that each node $a \in V$ represents an access point in A, and such that there is an edge $(a,b) \in E$ if access point a can shift some load to access point b. In other words, there exists a user $u \in U$ such that $x_{a,u} > 0$ and $r_{b,u} > 0$. The graph G=(V,E) represents paths in which loads may be shifted. The method then colors each node either white or black as shown in FIG. 8, where white represents access points not in $\tilde{L}$ and black indicates access points that may be included in the bottleneck group. Thus, the initial color of each node with load $\tilde{Y}$ is black, while the other nodes are colored white. As long as there is an edge $(a,b) \in E$ such that node a is black and node b is white, node a is colored white. At the end of this iterative process, the bottleneck load group $\tilde{L}$ comprises all the access points that are colored black and their associated users $\tilde{F}$ are determined by the association x calculated by LP1 (or LP2). It can be shown that, for G=(V,E), the graph that results from the association x calculated by LP2, and a set of the initial node colors, a given access point is included in $\tilde{L}$ if and only if its corresponding node in G, denoted by b, is colored black and there is no directed path in G from b to any white colored node. Finally, the bottleneck-group detection routine returns the sets $\tilde{L}$, $\tilde{F}$ and their corresponding user-AP association x. A formal description of this routine is given in FIG. 7 and an example of its execution is provided in FIG. 8.

The formal description of the bottleneck-group detection routine as shown in FIG. 7 is performed over the set of users U and the set of access points A. In the first step, LP1 is used to calculate $\tilde{Y}$. Then, LP2 is used to calculate an association x. Graph G=(V,E) is then constructed and each access point a is colored black if $y_a = \tilde{Y}$, otherwise the access point a is colored white if $y_a < \tilde{Y}$. As long as there are edge pairs of access points a and b and a is black and b is white, access point a is colored white. The load bottleneck group is determined as those access points colored black according to $\tilde{L} \leftarrow \{a | a$ is colored black$\}$. The fairness bottleneck group is determined as those users that meet the following criterion, $\tilde{F} \leftarrow \{u | \exists x_{a,u} > 0 \wedge a \in \tilde{L}\}$. Finally, the method outputs the user-AP associations for $\tilde{F}$ and $\tilde{L}$.

For the wireless system described above and shown in FIG. 3, a possible association calculated by is the one depicted in FIG. 8*a*. FIG. 8*b* represents the calculated graph G=(V,E) and the nodes' initial colors. In this system, $y_a = y_c = 1$ and $y_b = \frac{1}{2}$. Moreover, some load of user 2 or 3 can be shifted from access point b to access points c or a, which is indicated by the edges (b,c) and (b,a), and some load of user 4 or 5 can be shifted from access point c to access point b, which is indicated by the edge (c,b). In the following, this routine colors access point c with white and ends the coloring iterations. Consequently, the computed groups are $\tilde{L} = \{a\}$ and $\tilde{F} = \{1\}$, which are indeed the bottleneck groups. As a result, the load balancing method calculates a min-max load balanced association in the case that users are allowed to have fractional associations with access points.

For the sake of completeness, a short description of the rounding method is provided below. This description is tailored for unweighted greedy users but with minor modifications it can address other user characteristics, as explained further below. For a fractional association x and for each access point $a \in A$, $S_a = \lceil \Sigma_{u\in U} x_{a,u} \rceil$. Initially, the rounding method constructs a bipartite graph G'(x)=(U,V,E). Each node u in the set U of the bipartite graph represents a user u in U. The set V contains $S_a$ nodes for each access point $a \in A$ denoted by $\{v_{a,1}, v_{a,2}, \ldots, v_{a,S_a}\}$. The graph edges are determined by the following process. For each access point $a \in A$, the users $U_a$ are sorted according to a given sorting criterion. In the case of unweighted greedy users, the users in $U_a$ are sorted in non-decreasing wireless bit rate $r_{a,u}$ and they are renamed according to this order, $\{u_1, u_2, \ldots, u_{|U_a|}\}$. Moreover, $$C(a, u_j) = \sum_{i=1}^{j} x_{a,u_i}.$$

For each access point a, the users in $U_a$ are divided into $S_a$ groups, denoted by $Q_{a,s}$ where $1 \leq s \leq S_a$, according to their $C(a,u_j)$ values. Each group $Q_{a,s}$ contains all the users $u_j$ such that $s-1 < C(a, u_j) \leq s$ or $s-1 \leq C(a, u_{j-1}) < s$. A user that is included in two groups is referred as border node. The edges E of the graph represent user-AP association. Thus, for each access point a and every integer $s \in S_a$ node $v_{a,s}$ is connected to each user $u_j$ in $Q_{a,s}$. Such bipartite graph is given in the example below. After constructing the graph G', the rounding method looks for a maximal matching from each user to one of the nodes $v_{a,s} \in V$. Since the association x specifies a fractional matching such maximal matching exists and it determines the integral association of the users.

Again, the wireless system described in FIG. 3 and the fractional max-min fair association depicted in FIG. 3*d*. In this association, $x_{b,4} = x_{c,4} = \frac{1}{2}$ and its NBV is $$\vec{B} = \left\{1, \frac{4}{3}, \frac{4}{3}, \frac{4}{3}, \frac{4}{3}\right\}.$$

FIG. 9 presents the graph calculated by the rounding method and a corresponding matching. Consequently, the obtained load vector $$\vec{Y} = \left\{1, 1, \frac{1}{2}\right\}$$

and the corresponding NBV is $\vec{B} = \{1,1,1,1,2\}$. The latter is not the optimal max-min fair association. However, the bandwidth of each user u is at least half of its bandwidth in the fraction association.

The approximation ratio of this method can be shown for the case of unweighted greedy users. By starting with a useful property of the rounding method, each edge e of G' can be assigned a weight, x'(e), termed the association weight, that represents the fractional association of the corresponding user and access point. More specifically, for an edge $e=(v_{a,s}, u') \in E$ indicating that user u is associated with access point a, if user u is a non-border node, then it is included only in the set $Q_{a,s}$ and the following assignment is given, $x'(v_{a,s}, u) = x_{a,u}$. Otherwise, user u is included in the sets $Q_{a,s-1}$ and $Q_{a,s}$ and we partition the association $x_{a,u}$ with the two edges $(v_{a,s-1}, u)$ and $(v_{a,s}, u)$, such that $x'(v_{a,s}, u) = C(a,u) - s + 1$ and $x'(v_{a,s-1}, u) = x_{a,u} - x'(v_{a,s}, u)$. This assignment ensures the following property. For an access point $a \in A$ and a set $Q_{a,s}$, where s is an integer between 1 and $S_a$, it follows that, for any $s < S_a$, $$\sum_{u \in Q_{a,s}} x'(v_{a,s}, u) = 1 \text{ and } \sum_{u \in Q_{a,S_a}} x'(v_{a,S_a}, u) \leq 1.$$

For a node $v_{a,s} \in V$, its fractional wireless load is defined as $y^{frac,w}(v_{a,s}) = \sum_{u \in Q_{a,s}} x'(v_{a,s}, u) / r_{a,u}$. Moreover, if that node $v_{a,s}$ is associated to user $u \in Q_{a,s}$ in the calculated matching, then its integral wireless load is defined as $y^{int,w}(v_{a,s}) = 1/r_{a,u}$. Similarly, the fractional and integral infrastructure load of node $v_{a,s}$ are defined respectively as $y^{frac,i}(v_{a,s}) = \sum_{u \in Q_{a,s}} x'(v_{a,s}, u) / R_a$ and $y^{int,w}(v_{a,s}) = 1/R_a$. Consequently, for a node $v_{a,s} \in V$ such that $s > 1$, it follows that, $y^{int,w}(v_{a,s}) \leq y^{frac,w}(v_{a,s-1})$ and $y^{int,i}(v_{a,s}) \leq y^{frac,i}(v_{a,s-1})$. For each user $u \in Q_{a,s}$, $s > 1$ satisfied that $r_{a,u} \geq r_{a,u'}$ for every user $u' \in Q_{a,s-1}$. This is also true for the user $u^* \in Q_{a,s}$ that is matched with node $v_{a,s}$. Thus, $$y^{frac,w}(v_{a,s-1}) = \sum_{u' \in Q_{a,s-1}} \frac{x'(v_{a,s}, u')}{r_{a,u'}} \geq \sum_{u' \in Q_{a,s-1}} \frac{x'(v_{a,s}, u')}{r_{a,u^*}} = \frac{1}{r_{a,u^*}} = y^{int,w}(v_{a,s}).$$

Since all the users pose the same load, $1/R_a$, on the backhaul link, it can be seen that, independent of the user order, for each node $v_{a,s} \in V$ such that $s < S_a$, $y^{frac,i}(v_{a,s}) = 1/R_a$ and, for any node $v_{a,S_a} \in V$, it follows that $y^{frac,i}(v_{a,S_a}) \leq 1/R_a$. Consequently, $y^{int,i}(v_{a,s}) \leq y^{frac,i}(v_{a,s-1})$.

The integral load balancing method is now applied below for weighted greedy users. This method is similar to the one described above with different sorting criterion. It was observed that, in weighted instances, the calculated fractional solution $x^{frac}$ does not satisfy the rounding criterion above. This prevents the method from providing 2* max-main fairness approximation. However, by using a different sorting criterion, the method ensures 3* approximation.

A joined load of user u on access point a is defined as, $$J_{a,u} = \frac{x_{a,u} \cdot w_u}{r_{a,u}} + \frac{x_{a,u} \cdot w_u}{R_{a,u}}$$

The joined load may be either fractional or integral. For a given access point a, the method sorts the users $U_a$ in decreasing order of their joined loads, $J_{a,u}$. This order determines the manner in which the users $U_a$ are divided into groups $\{Q_{a,s}\}$. The rest of the rounding method remains the same.

The approximation ratio of the method is calculated with same threshold T defined in Equation 2. For a node $v_{a,s} \in V$, the fractional joined load is defined as $J^{frac}(v_{a,s}) = \sum_{u \in Q_{a,s}} x'(v_{a,s}, u) \cdot J_{a,u}$. Now, if that node $v_{a,s}$ is associated to user $u \in Q_{a,s}$ in the integral solution, its integral joined load is $J^{int}(v_{a,s}) = J_{a,u}$. Hence, the fractional and integral joined loads of access point $a \in A$ satisfy, $$J_a^{frac} = y_a^{frac,w} + y_a^{frac,i} = \sum_{u \in U_a} J_{a,u}^{frac} = \sum_{s=1}^{S_a} J^{frac}(v_{a,s}), \text{ and}$$

$$J_a^{int} = y_a^{int,w} + y_a^{int,i} = \sum_{u \in U_a} J_{a,u}^{int} = \sum_{s=1}^{S_a} J^{int}(v_{a,s}).$$

For a node $v_{a,s} \in V$ such that $s > 1$, the following holds true: $J^{int}(v_{a,s}) \leq J^{frac}(v_{a,s-1})$ as a result of rounding and the definition of a joined load. For an access point $a \in A$, the fractional joined load is related to the fractional access point load as $J_a^{frac} \leq 2 \cdot y_a^{frac}$ because $J_a^{frac} = y_a^{frac,w} + y_a^{frac,i} \leq 2 \cdot \max\{y_a^{frac,w}, y_a^{frac,i}\} = 2 \cdot y_a^{frac}$.

The association x calculated by integral load balancing method ensures 3* max-min fairness approximation with threshold T, as defined by Equation 2. First, it can be proven that, for each access point $a \in A$, it follows that $y_a^{int} \leq 2 \cdot y_a^{frac} + T$. From rounding and the definition of T it follows that, $$y_a^{int} = \max\left\{\sum_{s=1}^{S_a} y^{int,w}(v_{a,s}), \sum_{s=1}^{S_a} y^{int,i}(v_{a,s})\right\} \leq$$

$$\sum_{s=1}^{S_a} J^{int}(v_{a,s}) \leq T + \sum_{s=1}^{S_a-1} J^{frac}(v_{a,s}) \leq T + J_a^{frac}.$$

In turn, it results that $y_a^{int} \leq T + 2 \cdot y_a^{frac}$. Two cases are considered below:

Case I. Suppose that $y_a^{frac} \geq T$. Thus, $y_a^{int} \leq 3 \cdot y_a^{frac}$. It results that the normalized bandwidth $\bar{b}_u^{int}$ allocated to user u associated with access point a in the integral solution is $$\bar{b}_u^{int} = \frac{1}{y_a^{int}} \geq \frac{1}{3 \cdot y_a^{frac}} = \bar{b}_u^{frac} / 3.$$

Case II. Suppose that $y_a^{frac} < T$. Thus $y_a^{int} \leq 3 \cdot T$. Accordingly, each user u that is associated with access point a in the integral solution experiences a normalized bandwidth $$\bar{b}_u^{int} = \frac{1}{y_a^{int}} \geq \frac{1}{3 \cdot T},$$

and thereby completing the proof.

It is now shown that the inventive method finds the optimal integral solution for max-min time fairness. Time fairness attempts to provide a fair service time to the users regardless of the effective bit rates, $r_{a,u}$ and $R_a$, that they experience. Such fairness is considered, for instance, when the system bottlenecks are the backhaul links and all these links have the same bit rate, R. In such instance, a max-min time fairness solution also guarantees max-min bandwidth fairness. To achieve this goal, the method presented above is modified as follows: First, for each user $u \in U$ and access point $a \in A$, their effective bit rates $r_{a,u}$ and $R_a$ are set to 1 and the unweighted greedy variant is utilized for obtaining a fractional solution. Then, after calculating the bipartite graph G'(x)=(U,V,E), a cost $C(v_{a,s},u)=s$ is assigned to each edge $(v_{a,s},u) \in E$. Finally, the integral association is determined by the minimal cost maximal matching of the graph G'.

The time fairness method above calculates the optimal max-min time fairness association. From the description above, it follows that this method finds the optimal fractional solution. Thus, it is sufficient to prove that the method finds the optimal integral association for every fairness group $F_k \subseteq U$ and its corresponding load group $L_k \subseteq A$ with load $y_k$ of the fractional solution. Clearly, in this case, the load of each access point $a \in L_k$ is $y_k = y_a = \Sigma_{u \in U_a} x_{a,u}$. Thus, from the definition of $S_a$ above, it results that $S_a - 1 < y_a \leq S_a$ for every access point $a \in L_k$. Since all access points in $L_k$ have the same $S_a$, it is denoted by $S_k$ and the number of users that are associated with any access point $a \in L_k$ is at most $S_k$. Two cases are considered:

Case I: $y_k = S_k$. Thus, each access point in $L_k$ is associated with exactly $S_k$ users and this guarantees the required time fairness.

Case II: $y_k < S_k$. Consequently, some access points are associated with fewer than $S_k$ users. Note that this is a load conserving system, i.e., in any possible association of the user in $F_k$ associated with the access points in $L_k$, the total load on all the access points is $y_k \cdot |L_k| = |F_k|$. Since, the present method seeks for minimal cost matching no access point is associated with fewer than $S_k - 1$ users. From this, it results that exactly $(S_k - y_k) \cdot |L_k|$ access points are associated with $S_k - 1$ users and others are associated with $S_k$ users. This is a max-min time fair association.

Association Control of Bounded Demand Users

Association control is now applied to users with bounded bandwidth demands. For these calculations, the load definition is modified. Then, the new definition is employed to construct a new method, termed the adjusted load balancing method, that guarantees a 3* max-min fairness approximation. In the following, $d_u$ denotes the bounded demand of user $u \in U$ and its normalized demand is defined to be $\bar{d}_u = d_u/w_u$.

The need for a modified definition of load for the bounded demand user is best understood from the following example. For the wireless system described in FIG. 3, it is assumed that users 1, 2, 3, 4 are greedy (that is, they have very high demands), while the demand of user5 is $d_5=2$. Here, the max-min fair fractional-association is provided in FIG. 3*d* and the allocated bandwidth to user 5 is ⅘. In this case, the system does not satisfy the user bandwidth requirement. Therefore, user 5 behaves as a greedy user and the load that it imposes on access point c is $x_{c,5}/r_{c,5} = ½$. Now, if $$d_5 = \frac{1}{2},$$

the system satisfies the demand of user 5. However, user 5 consumes only a bandwidth of ½. As a result, the bandwidth that is allocated to user 4 by access point c is 1.5 and so its overall bandwidth allocation is 2⅙. The new NBV is $$\vec{B} = \left\{\frac{1}{2}, 1, \frac{4}{3}, \frac{4}{3}, 2\frac{1}{6}\right\}.$$

which is obviously not a min-max fair allocation. Hence, the need exists for a modification of the definition of load.

For a bounded demand user u that is associated with a single access point a and for $w_u = 1$, it follows that the load induced by user u on access point a is the time that access point a takes to provide user u one unit of traffic, and the load $y_a$ on access point a is the aggregated load of all its associated users. Thus, in a fair system, the bandwidth allocated to user u is $1/y_a$. However, if $d_u < 1/y_a$, then user u receives higher bandwidth than its demand. Conceptually, in a period of $y_a$ time units, user u consumes at most a traffic volume of $d_u \cdot y_a$, and the load of user u on access point a is just the time that takes access point a to provide this volume to user u. So, for the wireless channel, the load that user u induces on access point a, denoted by $y_{a,u}^w$, is $y_{a,u}^w = d_u \cdot y_a / r_{a,u}$ if $d_u > 1/y_a$ and it is $y_{a,u}^w = 1/r_{a,u}$ otherwise. As a result, a formal definition of the adjusted load for a weighted system and fractional association x is given as, $$y_{a,u}^w = \begin{cases} \dfrac{x_{a,u} \cdot w_u}{r_{u,a}} & \bar{d}_u \geq \dfrac{1}{y_a} \\ \dfrac{x_{a,u} \cdot w_u \cdot \bar{d}_u \cdot y_a}{r_{u,a}} & \bar{d}_u < \dfrac{1}{y_a} \end{cases} \quad (3)$$

Similarly, the load posed by user u on the backhaul link of access point a, denoted as $y_{a,u}^i$, is defined as follows:

$$y_{a,u}^i = \begin{cases} \dfrac{x_{a,u} \cdot w_u}{R_a} & \bar{d}_u \geq \dfrac{1}{y_a} \\ \dfrac{x_{a,u} \cdot w_u \cdot \bar{d}_u \cdot y_a}{R_a} & \bar{d}_u < \dfrac{1}{y_a} \end{cases} \quad (4)$$

Consequently, the load of an access point $a \in A$ is.

$$y_a = \max\left\{\sum_{u \in U} y_{a,u}^w, \sum_{u \in U} y_{a,u}^i\right\} \quad (5)$$

From the adjusted load definition, it is seen that, as long as a user demand is satisfied, the load that it poses on its associated access point decreases as the total load of this access point decreases. In the example that follows, it is illustrated that this definition can be used to obtain max-min fair bandwidth allocation. Consider the same settings as described in the exemplary system shown in FIG. 3 with the association depicted in FIG. 3*d*. It is assumed that $$d_5 = \frac{1}{2}$$

and that users 1-4 are greedy. It is also assumed that the load on access points b and c is $y_b = y_c = 4/7$ and the association of user 4 is $x_{b,4} = 1/7$ and $x_{c,4} = 6/7$. These assignments satisfy the methodology of Equations 3-5 above. The load on access point b is $$y_b = \frac{1}{4} + \frac{1}{4} + \frac{1}{7} \cdot \frac{1}{2} = \frac{8}{14} = \frac{4}{7}$$

and the load of access point c is $$y_c = \frac{6}{7} \cdot \frac{1}{2} + \frac{1}{2} \cdot \frac{4}{7} \cdot \frac{1}{2} = \frac{4}{7}.$$

From this, it is known that the bandwidth allocation to users 2, 3, and 4 is 1.75 and the corresponding NBV is $$\vec{B} = \left\{\frac{1}{2}, 1, \frac{7}{4}, \frac{7}{4}, \frac{7}{4}\right\}.$$

Since the load on access points and is balanced, this is a min-max load balanced association.

With the adjusted load definition, any fractional min-max load balanced association x for bounded demand users divides the access points into load groups $\{L_k\}$ such that the load on the access points in each group $L_k$ is $y_k$ and each group $L_k$ is uniquely associated with a set of users $F_k$, termed a fairness group. This association also obtains a max-min fair bandwidth allocation. However, unlike the greedy user model, a fairness group $F_k$ may include users with allocated normalized bandwidth less than $1/y_k$. These users, of course, are bounded-demand users with normalized demands $\bar{d}_u 1 </y_k$. Consequently, the users in a given fairness group $F_k$ are defined as the users served by the access points of a given load group $L_k$, regardless of their allocated bandwidth.

In the following description, an adjusted load balancing method is presented for calculating a max min fair association x in the presence of bounded-demand users. Since the foundational principles of load groups and fairness are satisfied in this case, the method is extended to support also bounded demand users. The main challenge is calculating the load of the load groups $\{L_k\}$ induced by the optimal fractional solution, in particular, the problem centers on detecting the bottleneck load value $\tilde{Y}$ in the bottleneck-group detection routine in given above. This problem is not easily resolved, since the adjusted load definitions yield a complicated set of non-linear equations with feedback. To simplify the proof, it will be assumed that all the users behave as if they are greedy users. This can be achieved by assigning virtual channel conditions to bounded demand users appropriately, such that for each user u with $d_u/w_u < 1/\tilde{Y}$ its demand will be satisfied only when the load of its associated access points is exactly $\tilde{Y}$. For that purpose, the bottleneck load value is estimated and denoted by Y. Y is used to define adjusted bit rates $r'_{a,u}$ and $R'_{a,u}$ of both the wireless and the wired links for each pair of access point a and user u. Consequently, for user u with maximal bandwidth requirement, $d_u$, its adjusted bit rates are:

$$r'_{a,u} = \begin{cases} r_{u,a} & \bar{d}_u \geq \frac{1}{Y} \\ \frac{r_{u,a}}{\bar{d}_u \cdot Y} & \bar{d}_u < \frac{1}{Y} \end{cases} \quad (6)$$

and $$R'_{a,u} = \begin{cases} R_a & \bar{d}_u \geq \frac{1}{Y} \\ \frac{R_a}{\bar{d}_u \cdot Y} & \bar{d}_u < \frac{1}{Y} \end{cases} \quad (7)$$

For greedy users, $d_u = \infty$. Now, by employing LP1 above, the estimation can be verified as to whether $Y = \tilde{Y}$ using the adjusted bit rates $r'_{a,u}$ and $R'_{a,u}$. Thus, by performing a binary search, the value of $\tilde{Y}$ is accurately calculated. After $\tilde{Y}$ is detected, the second and third steps of the bottleneck-group detection routine can be used to infer the bottleneck groups $\tilde{L}$ and $\tilde{F}$ and iteratively calculate the entire optimal fractional solution. Finally, the rounding method of the weighted greedy users above is invoked to obtain an integral solution. In this calculation, the adjusted bit rates of the users, as calculated by the fractional solution, are utilized to construct the sets $Q_{a,s}$.

For a calculated fractional association x when using the adjusted bit rates and for $\{L_k\}$ and $\{F_k\}$ as the corresponding respective load and fairness groups, if a user $u \in F_k$ exists with bounded demand $d_u$, then the bandwidth allocated for user u is $$b_u = \frac{w_u}{y_k}, \text{ if } \frac{d_u}{w_u} \geq \frac{1}{y_k};$$

otherwise, its allocated bandwidth is $b_u = d_u$. All the access points in $F_k$ have the same load $$\frac{d_u}{w_u} \geq \frac{l}{y_k},$$

then it follows that $r'_{a,u} = r_{a,u}$ and $R'_{a,u} = R_a$ for each $a \in F_k$ and since the users are treated as being greedy, it can be shown that $b_u = w_u/y_k$. Otherwise, if $$\frac{d_u}{w_u} < \frac{l}{y_k},$$

it follows that for each $a \in F_k$, $$r'_{a,u} = \frac{r_{u,a}}{d_u \cdot y_k} \text{ and } R'_{a,u} = \frac{R_a}{d_u \cdot y_k}.$$

For simplicity, $b_u$ is calculated over the wireless domain, and the calculation for the wired domain is very similar. If $t_{a,u}$ is defined as the time that user u is served by access point a during a single time unit, then $$t_{a,u} = \frac{x_{a,u} \cdot w_u}{y_k \cdot r'_{a,u}}$$

and as a result, $$b_u = \sum_{a \in A_u} t_{a,u} \cdot r_{a,u} = \sum_{a \in A_u} \frac{x_{a,u} \cdot w_u}{y_k \cdot r'_{a,u}} \cdot r_{a,u} = \sum_{a \in A_u} \frac{x_{a,u} \cdot w_u}{y_k \cdot \frac{r_{u,a} w_u}{d_u \cdot y_k}} \cdot r_{a,u} = \sum_{a \in A_u} x_{a,u} \cdot d_u = d_u.$$

The adjusted load balancing method calculates a min-max load balanced association for the fractional-association model with bounded demand users. This association also ensures max-min fair bandwidth allocation.

In this analysis, guarantees on the quality of the integral solution are provided as long as the bounded demand users behave as greedy users. Therefore, threshold T' is defined to be, $$T' = \max_{\{u,a | u \in U \wedge a \in A \wedge r_{a,u} > 0\}} \max\left\{\frac{w_u}{r_{a,u}}, \frac{w_u}{R_a}, \frac{1}{d_u}\right\}. \quad (8)$$

It can then be shown that the association x calculated by adjusted load balancing method ensures 3* max-min fairness approximation with threshold T', as defined by Equation 8.

Online Integral Association

In this section, a method is presented that deals with dynamic user arrivals and departures that can occur in a real operating Wireless LAN environment such as a campus or a coffee shop or the like. Repeated execution of the offline method each time a user arrives or departs may cause frequent association changes that disrupt existing user sessions. To avoid this, a new strategy is proposed that enables a balance to be struck between the frequency of the association changes and the optimality of the network operation in terms of load balancing. For this purpose, two configuration parameters are suggested for use; time threshold, $\tau$, and load threshold $\Delta$. The offline association method is then repeated if either of the following two conditions occur: (1) The time elapsed since the last offline optimization is more than the time threshold $\tau$ or (2) The current bottleneck load, i.e., the maximal load among all access points, is $\Delta$ more than the bottleneck load obtained by the last execution of the offline method. After repeating the method, any user in need of an association change can have it performed between its session arrivals to avoid disruption of its ongoing sessions. This method is illustrated in FIG. 10.

FIG. 10 shows a formal description of the online load balancing method for user u over the entire network of users and access points as shown in the first entry Alg Online_Load_Balancing(A,U, u). The method proceeds so that, if the elapsed time from last offline optimization is greater than the time threshold, $\tau$, the integral load balancing method will be applied for A and U∪u. The offline load on the access points is output as $y_{offline} \leftarrow \max_{a \in A} y_a$. But if the elapsed time is less than or equal to the time threshold, then an method known herein as the MethodByAAFPW (described below) is performed to identify an access point as shown by a←MethodByAAFPW(A,u). Then the online load on the access points is output as $y_{online} \leftarrow \max_{a \in A} y_a$. By using the online and offline loads, it is possible to determine whether their difference exceeds the load threshold by the step shown as $(y_{online} - y_{offline} \leftarrow \Delta)$. If the load threshold is exceeded then the system performs an integral load balancing shown as Integral_Load_Balancing(A, U∪u). Otherwise the user u is assigned to access point a at the end of this method.

Between two offline optimization occurrences, users must be associated with access points as the users arrive. The online method of Aspnes et al. in Proc. ACM STOC, pp. 623-631 (1993), incorporated herein by reference in its entirety, is adapted to achieve a O(log n) approximation factor as compared to the offline optimal, where n is number of users in the system. This adapted method is referenced as MethodByAAFPW. In this adapted method, the load in the original method is substituted here by the integral load of the access points, $y_a^{int}$.

In online user association, there are two conflicting factors that need addressing. Intuitively, a user should be assigned to the less loaded access points that are within its transmission range. However, the data rate from the user to these access points can be very low which, in turn, can add very high additional load to the access points. Therefore, a user should be assigned to an access point where it causes small additional load. To capture these two trade-offs, the Aspnes et al. method defines a potential function that is exponential in the load of an access point. When a new user arrives, all possible user-AP associations are evaluated. After the evaluation, the assignment that minimizes the increase of the potential function is selected. It can be demonstrated that, using certain potential functions, the highest load among all access points of the online method is within O(log n) factor of the highest load among all access points of the offline method.

Results

Simulations were performed using the methods described above on a WLAN in order to compare performance in the context of max-min fairness with two popular heuristics, namely the Strongest-Signal-First (SSF) method and the Least-Loaded-First (LLF) method. The SSF method is the default user-AP association method in the IEEE 802.11 standard. The LLF method is a widely-used load-balancing heuristic, in which a user chooses the least-loaded access point that the user can reach.

For a fair comparison, it is assumed that the same scheduling mechanism exists at the access points for all three methods, such that the only difference in the systems is the assignment decisions between users and access points. The simulation setting is as follows. A simple wireless channel model is utilized in which the user bit rate depends only on the distance to the access point. In adopting the values commonly advertised by 802.11b vendors, it is assumed that the bit rate of users within 50 meters of an access point is 11 Mbps, within 80 meters the bit rate is 5.5 Mbps, within 120 meters the bit rate is 2 Mbps, and within 150 meters the bit rate is 1 Mbps. The maximum transmission range of an access point is set to be 150 meters. The backhaul capacity is assumed to be 10 Mbps to emulate an Ethernet infrastructure. In the simulated system, a total of 20 access points are located on a 5 by 4 grid, where the distance between two adjacent access points is set to 100 meters and it is assumed that an appropriate frequency planning was made. The number of users is either 100 to simulate a moderately loaded network or 250 to simulate a heavily loaded network. It is further assumed that all users are greedy.

The description below is focused on the case of hot-spots that are more common in practical WLANs. All users are located within a circularly shaped hot spot at the center of the WLAN network. The radius of the hot spot is set to 150 meters. Even if the size of the hot spot is the same as that of one 802.11 cell, the users still can reach several cells because of the overlap between cells.

Figure 11:
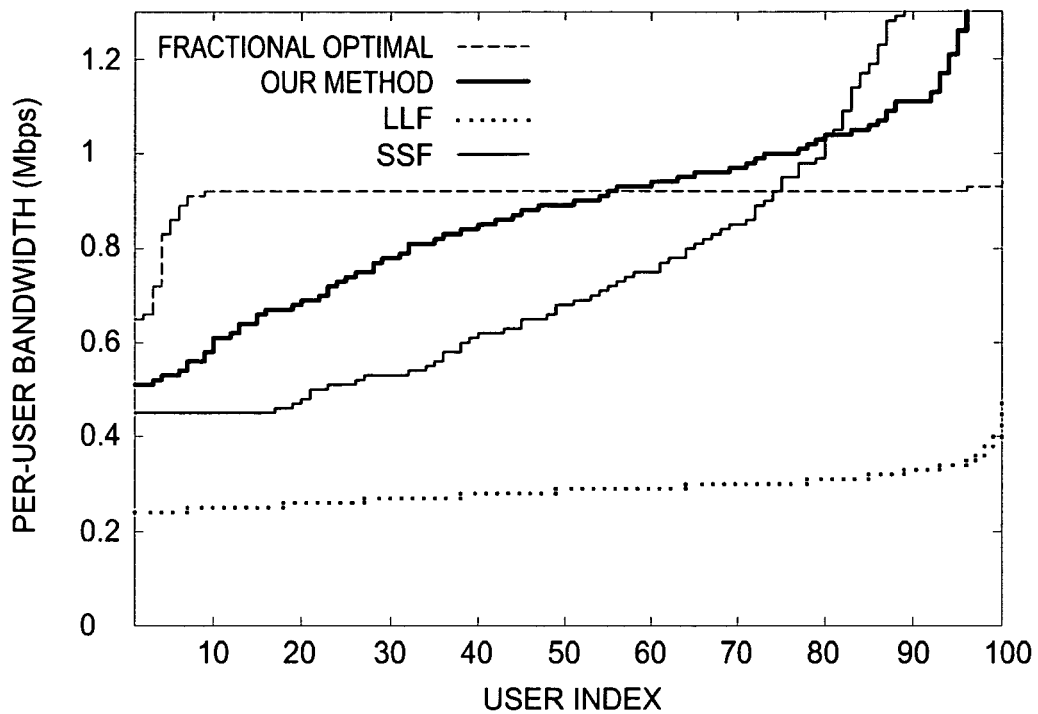
FIG. 11 shows a comparison in graphical form of per user bandwidth versus the number of users (up to 100 users) for networks operating under a number of methods including the present method.
Figure 12:
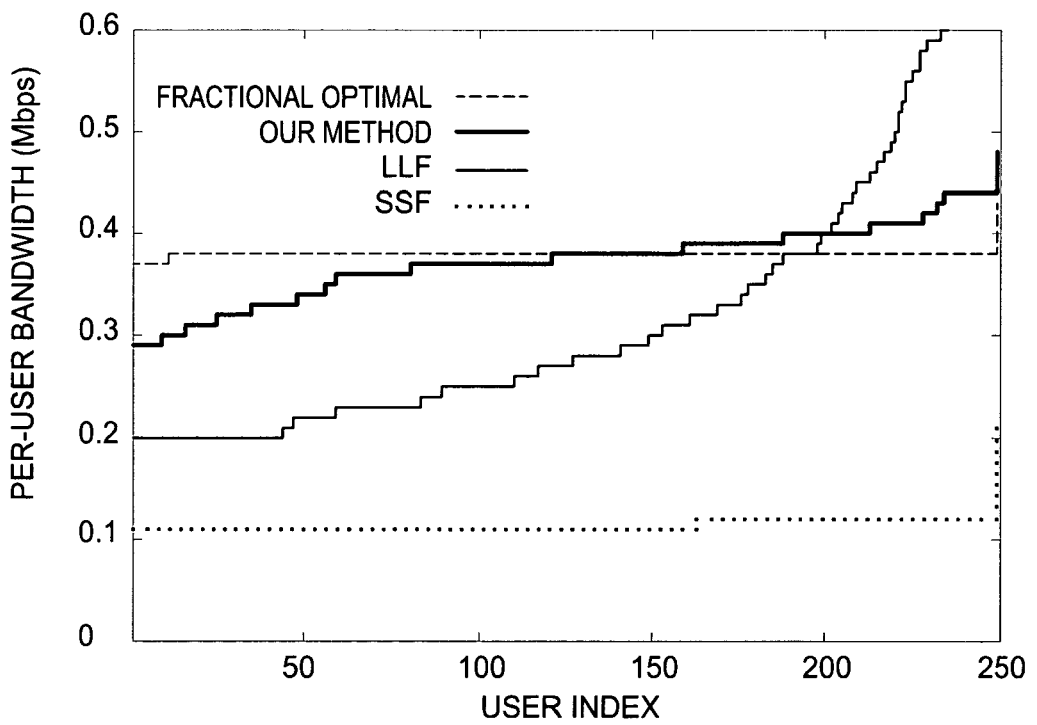
FIG. 12 shows a comparison in graphical form of per user bandwidth versus the number of users (up to 250 users) for networks operating under a number of methods including the present method.

FIGS. 11 and 12 show the results with 100 and 250 users, respectively. The Y axis represents the per-user bandwidth and the x axis represents the user index. It should be noted that the users are sorted by their bandwidth in increasing order. The user locations are different at each run of the simulation, and therefore the bandwidth of the user with the same x index actually indicates the average bandwidth of xth lowest bandwidth user. The present method outperforms the two heuristics not only in terms of fairness but also in terms of total system throughput. For instance, in FIG. 11, the median per-user bandwidth value of our method is over 20% higher than that of the SSF method. The bandwidth values are obtained by averaging the results of 100 simulation runs. It is observed that the SSF approach outperforms the LLF method in terms of both max-min fairness and overall network throughput. This supports the belief stated above that a naive load-balancing method may yield very poor results. By comparing the results shown in FIG. 11 and FIG. 12, it can be concluded that the gap between the inventive method and the fractional optimal solution narrows as the number of users increases. This can be explained by observing that the impact of each user in the integral association scheme decreases as the number of users increases. Thus, with an infinite number of users, the results of integral association and fractional association will converge.

Figure 13:
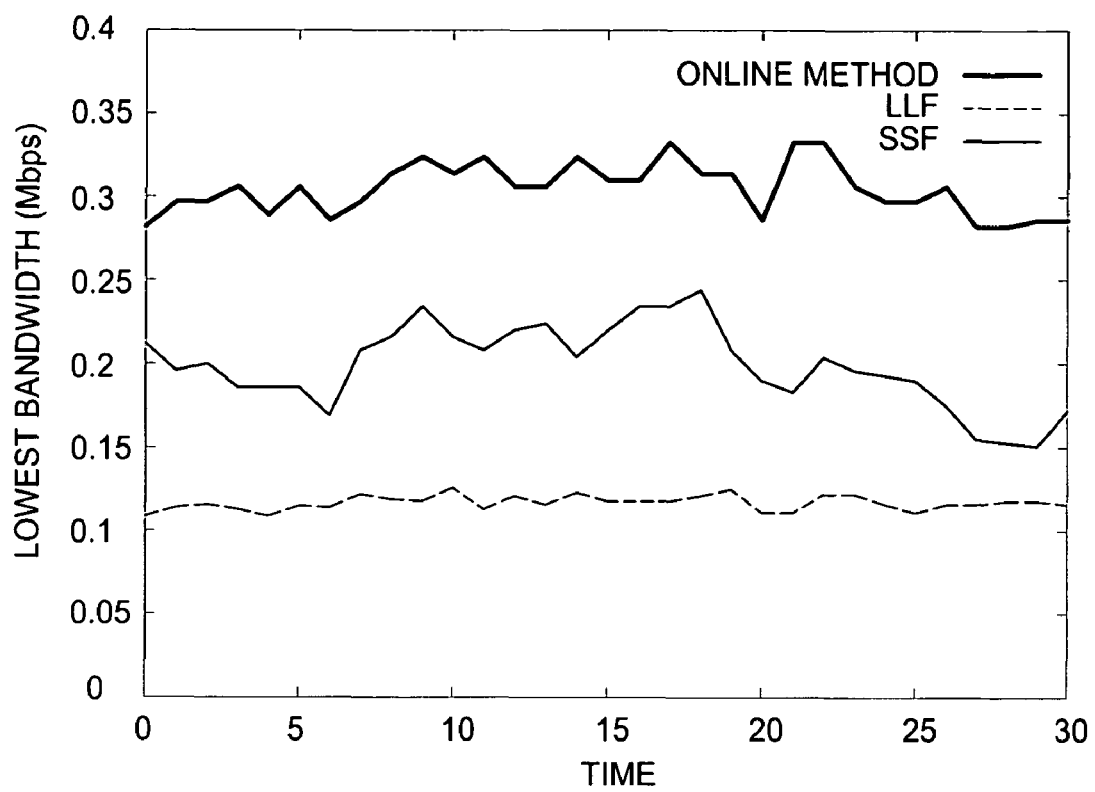
FIG. 13 shows comparative results in graphical form of lowest bandwidth versus time for 250 users of a number of methods including the online load balancing method.

The online method has also been simulated. In order to simulate the dynamic user departure/arrival (or the user mobility), a certain portion of users are taken out of the system at each time slot and the same number of new users are injected into the system at each time slot. The result of the highly dynamic case where 20% of users are replaced at every time slot is shown in FIG. 13. IN FIG. 13, the Y axis represents the lowest user bandwidth and the x axis represents time. In the example shown, the offline method is periodically invoked at every 15 time slots or when the bottleneck difference exceeds 25%. Note that the result is episodic, since it depicts the evolution of the system for one simulation run. Nevertheless, the presented result is very typical. In the presented case, the offline method was invoked 5 times including 20th time slot.

As wireless LANs are deployed to cover larger areas and are increasingly more and more relied on to carry important tasks, it is essential that they be managed in order to achieve desired system performance objectives. The teachings of this invention are directed at solving one of the problems, namely, providing fair service to users and balancing the load among access points. These goals are obtained by intelligently determining the user-AP association, termed association control. The association control problem was rigorously formulated in the context of wireless LANs and approximation methods were presented that provide guarantees on the quality of the solution. Simulations from experimental practice confirm that the inventive methods, indeed, achieve close to optimal load balancing and max-min fair bandwidth allocation, and significantly outperform popular heuristics. Moreover, it was shown that, in some cases, by balancing the load on the access points, the overall network throughput is increased.

Glossary of Terms

Terms utilized in the description above are collected herein for ease of understanding and quick reference. The terms are as follows:

a denotes an individual access point;
A is the set of access points;
AP is the access point;
$A_u$ denotes the set of access points with which user u is associated;
B is the bandwidth allocation matrix;
$\vec{B}$ is the normalized bandwidth vector (NBV);
$b_{a,u}$ is the average bandwidth allocated to user u by access point a;
$b_u$ is the aggregated bandwidth entitled to user u;
$\bar{b}_u$ is the normalized bandwidth allocation to user u;
$d_u$ is the maximal bandwidth demand of user u that sets an upper bound on the bandwidth needs of that user;
$F_k$ is a fairness group and $\tilde{F}$ is the bottleneck fairness group;
G is a graph with E edges and V vectors;
$J_{a,u}$ is a joined load of user u on access point a;
$L_k$ is a load group and $\tilde{L}$ is the bottleneck load group;
LLF is the Least Loaded First method;
LP1 and LP2 are linear programs;
m is the number of access points;
n is the number of mobile users;
NOC is the network operation center;
$R_a$ is the fixed transmission bit rate for an access point a in bits per second as provided by the infrastructure;
$r_{a,u}$ is the average effective bit rate for a user u and an access point a;
SSF is the Strongest Signal First method;
T is a threshold maximal load that a user can impose on an access point;
u denotes an individual mobile user;
U is the set of mobile users;
$U_a$ is the set of users associated with access point a;
v is any other user from the set of mobile users U;
$w_u$ is the weight of user u wherein the weight is a specification of the priority for that user;
x is a fractional association matrix;
x* is a fractional min-max load balanced association or a fractional max-min fair association;
$x_{a,u}$ is the fractional association of user u with access point a;
$\vec{Y}$ is the load vector of an association matrix x;
$\hat{Y}$ is the bottleneck load;
$y_a$ is the load on access point a;
$y_a^{frac}$ is the optimal fractional association on access point a;
$y_a^{int}$ is the optimal integral association on access point a;
$\Delta$ is a load threshold; and
$\tau$ is a time threshold.

What is claimed is:

1. A method for associating wireless local area network users with at least one wireless local area network access point, the method comprising:
   receiving user parameters for each user in the wireless network;
   determining, by a processor, a first set of associations between each user and one or more access points based on the user parameters using fractional load balancing;
   partitioning the set of access points into a set of load groups {Lk} wherein a load on each access point in a particular load group is Yk;
   dividing users into a set of fairness groups {Fk} wherein a normalized bandwidth experienced by a user in a particular fairness group is 1/yk: and
   producing a second set of associations by rounding so that, in said second set, each user is associated with only one access point.

2. The method of claim 1, wherein said step of producing comprises balancing the associations between each user and the access points.

3. The method of claim 1, further including the step of transmitting the second set of associations to the wireless local area network users.

4. The method of claim 3, wherein the user parameters include a weight ($w_u$) for each user (u), an average bandwidth demand ($d_u$) for each user, and an effective bit rate ($r_{a,u}$) experienced between a user (u) and a particular access point (a) for each access point in the network.

5. The method of claim 4, wherein the effective bit rate ($r_{a,u}$) user parameter is measured by each use by monitoring the signal strength of respective proximate access points.

6. The method of claim 1, further including the step of initiating the determining step as a result of user activity including arrival of a user to the network or departure of a user from the network.

7. The method of claim 3, further including the step of initiating the determining step on a periodic time basis.

8. The method of claim 7, wherein the determining step further includes the steps of:
   selecting as a bottleneck load group the load group having its load $y_k$ as the maximum load for the groups in the set of load groups;
   selecting an associated fairness group partitioning the set of access points into a set of load groups {$L_k$} wherein a load on each access point in a particular load group is $y_k$;
   calculating an optimum bottleneck load $\hat{Y}$ for the selected bottleneck load group so that the bottleneck load $\hat{Y}$ provides an upper bound to the load on every access point; and determining the first association so that the load on each access point in the bottleneck load group is $\tilde{Y}$ and so that the access points in the bottleneck load group are associated with the users in the associated fairness group.

9. The method of claim 8, further comprising the steps of:
minimizing an overall load on all the access points in the network wherein the load on each access point is less than or equal to the bottleneck load $\tilde{Y}$;
identifying access points outside the bottleneck load group as being those access points whose load is less than the bottleneck load $\tilde{Y}$;
separating access points in the bottleneck load group from the network of access points; and
generating a revised bottleneck load group $\tilde{L}$, an associated bottleneck fairness group $\tilde{F}$, and their corresponding user to access point association $\tilde{X}$.

10. The method of claim 9, further comprising the steps of:
removing access points in the bottleneck load group $\tilde{L}$ from an entire set of access points in the network;
removing the users in the associated bottleneck fairness group $\tilde{F}$ from the plurality of users in the network;
updating the first set of associations with the association $\tilde{X}$; and
repeating the method beginning at the step of selecting as the bottleneck load group the load group having its load $y_k$ as the maximum load for the groups in the set of load groups until all fairness groups and load groups have been removed.

11. A method for associating wireless local area network users with at least one wireless local area network access point, the method comprising:
determining, by a processor, differences in average bandwidth demand associated with the users in the wireless network;
partitioning the set of access points into a set of load groups {Lk} wherein a load on each access point in a particular load group is Yk;
dividing users into a set of fairness groups {Fk} wherein a normalized bandwidth experienced by a user in a particular fairness group is 1/yk: and
using the determined differences to balance user load among a plurality of access points forming the wireless network, said balancing comprising evenly distributing users with high average bandwidth requirements among the access points.

12. The method of claim 11, wherein said step of determining comprises:
determining a first set of associations between each user and one or more access points based on user parameters using fractional load balancing; and
producing a second set of associations by rounding so that, in said second set, each user is associated with only one access point.

13. The method of claim 12, wherein the user parameters include a weight ($w_u$) for each user (u), an average bandwidth demand ($d_u$) for each user, and an effective bit rate ($r_{a,u}$) experienced between a user (u) and a particular access point (a) for each access point in the network.

14. The method of claim 13, wherein the effective bit rate ($r_{a,u}$) user parameter is measured by each use by monitoring the signal strength of respective proximate access points.

15. The method of claim 11, further including the step of initiating the determining step as one or both of (a) a result of user activity including arrival of a user to the network or departure of a user from the network and (b) a periodic time basis.

16. The method of claim 11, wherein the determining step further includes the steps of:
selecting as a bottleneck load group the load group having its load $y_k$ as the maximum load for the groups in the set of load groups;
selecting an associated fairness group partitioning the set of access points into a set of load groups $\{L_k\}$ wherein a load on each access point in a particular load group is $y_k$;
calculating an optimum bottleneck load $\tilde{Y}$ for the selected bottleneck load group so that the bottleneck load $\tilde{Y}$ provides an upper bound to the load on every access point; and
determining the first association so that the load on each access point in the bottleneck load group is $\tilde{Y}$ and so that the access points in the bottleneck load group are associated with the users in the associated fairness group.

17. The method of claim 16, further comprising the steps of:
minimizing an overall load on all the access points in the network wherein the load on each access point is less than or equal to the bottleneck load $\tilde{Y}$;
identifying access points outside the bottleneck load group as being those access points whose load is less than the bottleneck load $\tilde{Y}$;
separating access points in the bottleneck load group from the network of access points; and
generating a revised bottleneck load group $\tilde{L}$, an associated bottleneck fairness group $\tilde{F}$, and their corresponding user to access point association $\tilde{X}$.

\* \* \* \* \*